Oct. 19, 1943.    F. D. PALMER    2,331,927
PACKAGE SEALING APPARATUS
Filed Aug. 11, 1941    9 Sheets-Sheet 3

Fig. 3

Inventor
Frank D. Palmer
By Soans, Paul & Anderson Attys.

Fig. 4

Patented Oct. 19, 1943

2,331,927

UNITED STATES PATENT OFFICE 2,331,927

PACKAGE SEALING APPARATUS

Frank D. Palmer, Chicago, Ill., assignor to Kraft Cheese Company, a corporation of Delaware Application August 11, 1941, Serial No. 406,321

21 Claims. (Cl. 93—6)

This invention relates to package sealing apparatus and more particularly to apparatus for adhesively bonding together in face to face relation the top closure portions of a wrapper. The main objects of the invention are to provide continuously operating apparatus for propelling the package operated upon and for effecting folding of certain portions of the package wrapper to close the package and subsequent sealing or bonding of certain portions of the wrapper which are brought into face to face relation as an incident to the closing of the package; to provide apparatus of the character indicated which will be of relatively simple construction in view of the operations performed; to provide apparatus of the character indicated which will be efficient and durable in operation and which will require a minimum of attention for maintenance purposes; to provide such apparatus which will be wholly automatic in its operation; and in general it is the object of the invention to provide improved apparatus of the character indicated.

Other objects and advantages of the invention will be understood by reference to the following specification and accompanying drawings (nine sheets) wherein there is disclosed apparatus embodying a selected form of the invention.

General explanation

Figures 11, 12:
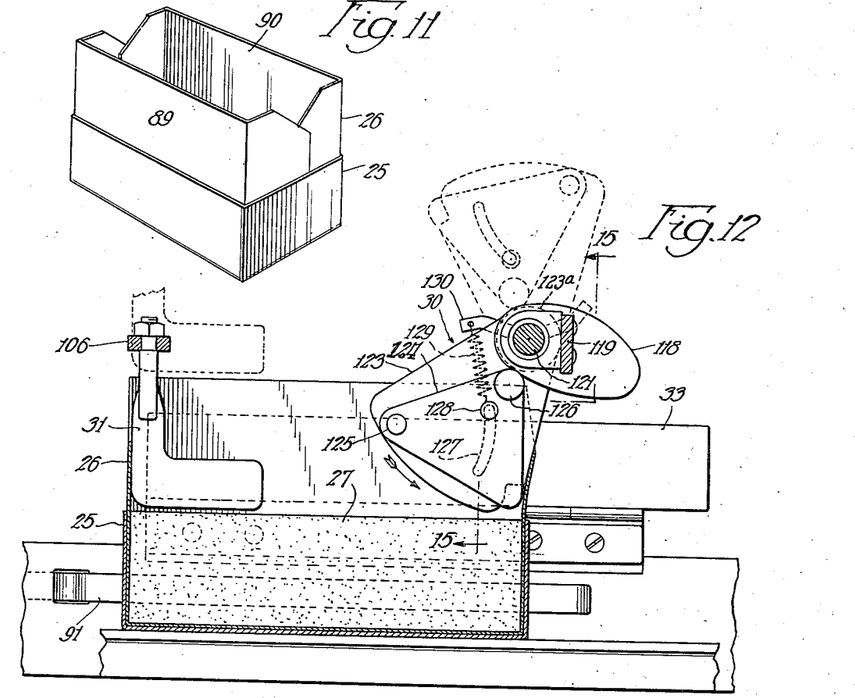
Fig. 11 is a perspective of an unclosed package in the form in which it is delivered to the improved apparatus for closing and sealing.
Fig. 12 is a section on the line 12—12 of Fig. 3, but showing the parts in a changed position.

Referring now to the drawings, the apparatus therein disclosed is designed to receive a filled but open package substantially in the condition illustrated in Fig. 11. As there shown, the package comprises an outer container 25 and a liner 26 which projects upwardly beyond the upper edge of the outer container 25 so as to provide liner material adapted to be folded to close the open top of the package. When the package is delivered to the apparatus herein disclosed, it is filled with the desired quantity of material indicated by the stippled area 27 in Fig. 12.

Figure 10:
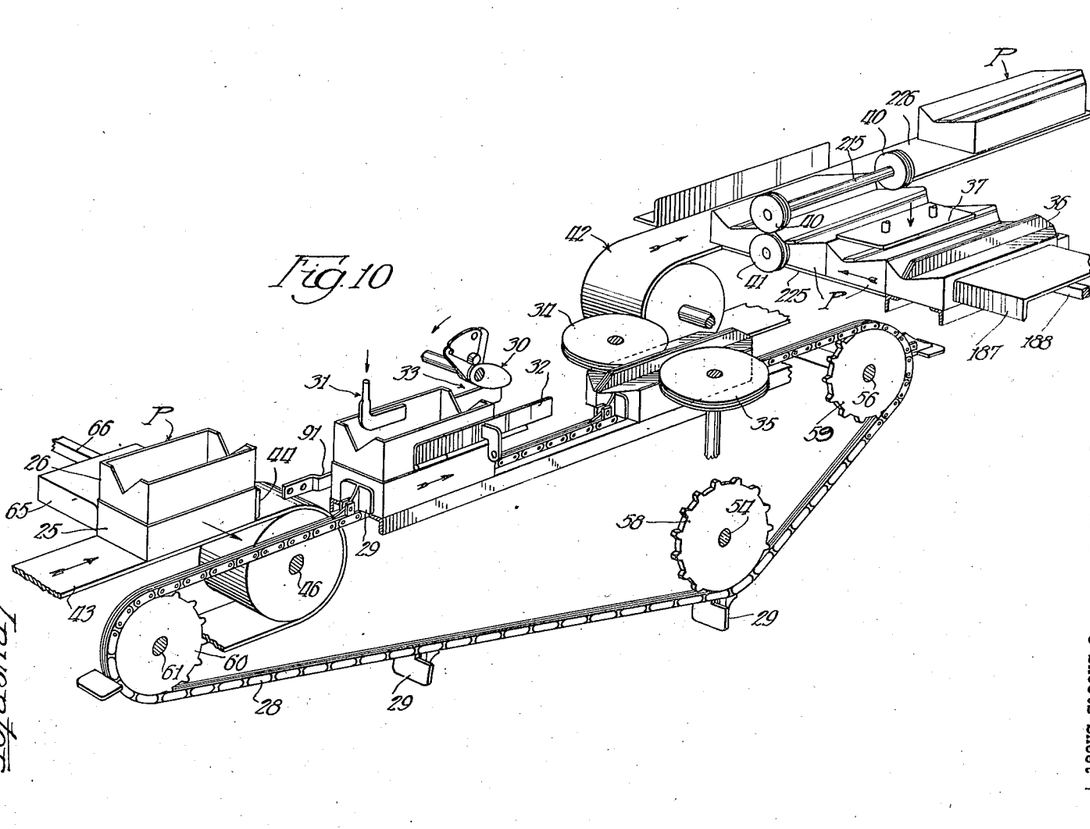
Fig. 10 is a schematic perspective illustration of the principal elements of the improved apparatus.
Figures 14, 15, 16, 17, 18, 19, 20:
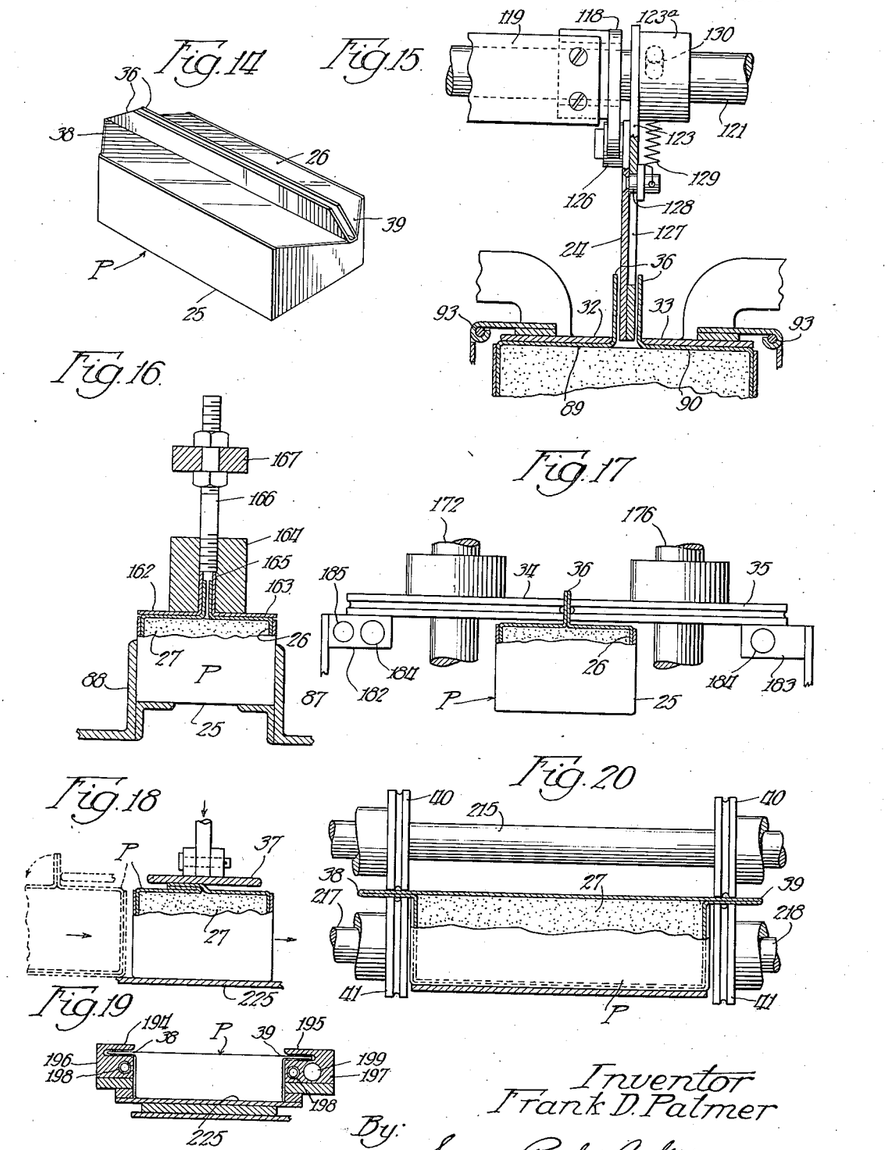
Fig. 14 is a perspective of the package in closed but not sealed condition as it is delivered after passing through the mechanism illustrated in Figures 12 and 13.
Fig. 15 is a section on the line 15—15 of Fig. 12.
Fig. 16 is a section on the line 16—16 of Fig. 1.
Fig. 17 is a fragmentary section through certain sealing apparatus shown in general in Fig. 1.
Figs. 18, 19 and 20 are sections, respectively, on the lines 18—18, 19—19 and 20—20 of Fig. 1.

As shown in Figure 10, the filled but open package is delivered into the interior of a feeding conveyor chain 28 which has a series of flights or pushers 29 secured to it in properly spaced relation for advancing the packages continuously. The packages are first acted upon by front and rear end folders 30 and 31, respectively, and opposite side folders 32 and 33, which serve to fold the exposed liner portions 26 into package closing position substantially as illustrated in Figure 14. As there shown, the liner material 26 has had its front and rear end portions folded outwardly from the opposite ends of the package and the opposite side portions of the liner have been folded inwardly and their inner marginal portions turned upwardly so as to be disposed in approximately face to face relation.

The package in the closed condition shown in Figure 14 is next propelled into the zone of operation of a pair of sealing wheels designated 34 and 35 which cooperate to squeeze between them the upwardly extending marginal or flange-like portions 36 of the liner. The liner is preferably made of material which may be jointed by the application of pressure by means of the sealing wheels 34 and 35. Such material may be any of the various kinds of heat-sealable wrapping material now available on the market, or it may be any suitable form of wrapping material having on its inner surface a coating of thermoplastic material which enables the wrapper to be sealed in the manner explained. The present apparatus has been designed especially for sealing packages employing a liner or wrapper embodying a thermoplastic coating containing a mixture of rubber and wax, but it will be evident that the apparatus may readily be adapted for sealing other kinds of material.

In the present embodiment of the invention means is provided for heating the sealing wheels 34 and 35 so that the latter apply both heat and pressure to effect the sealing operation.

When the closed and sealed package emerges from the zone of operation of the sealing wheels 34 and 35 it is next moved in a transverse direction so as to cause its then upstanding sealed flange 36 to engage an edge of a plate 37 to be thereby folded rearwardly into flatwise position on the top surface of the package. The plate 37 is also moved vertically to press the folded joint flange 36 tightly to the top surface of the package. The endwise extending ears 38 and 39 of the package are then passed between pairs of sealing wheels indicated at 40 and 41, respectively, which cooperate to seal the end ears substantially in the same manner that the wheels 34 and 35 seal the top flange 36.

When the package emerges from the feeding wheels 40 and 41, it is delivered to another conveyor 42 which preferably travels continuously and carries the package to other manual or mechanical operation stations for folding the triangular end ears and completing the package by applying a supplemental outer container for covering the sealed top.

*Detailed explanation*

Figure 1:
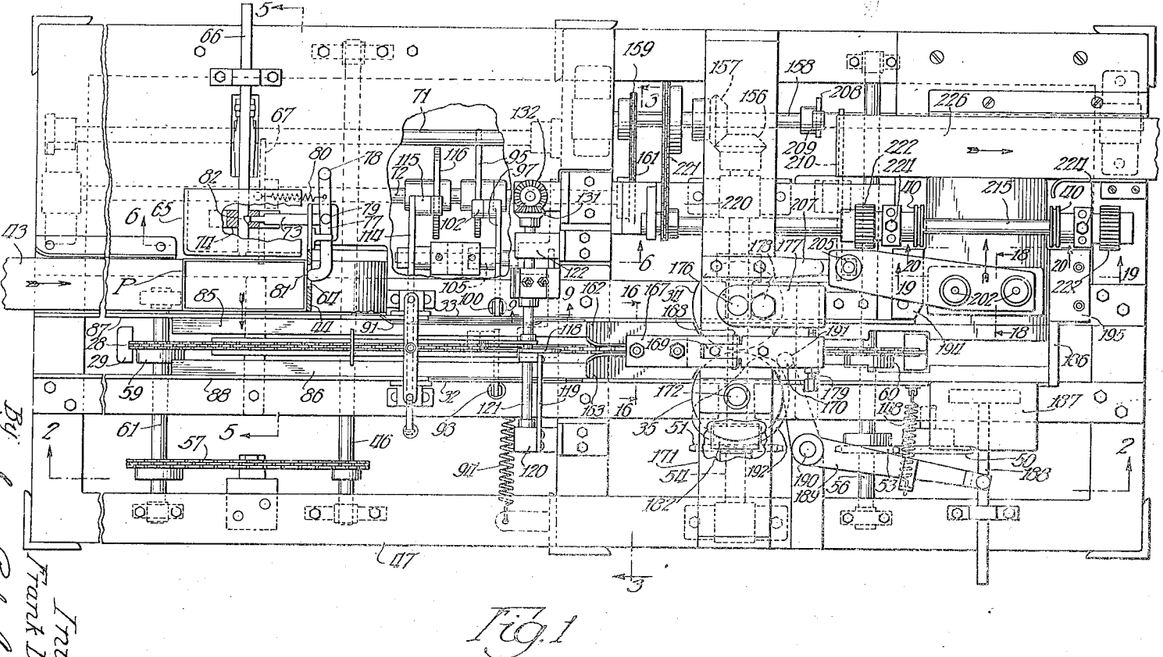
Fig. 1 is a plan.

The filled but open packages are delivered to the present apparatus by means of a conveyor belt 43 which may be a continuously driven belt if desired. One such package is indicated in Figure 1 by the reference "P" and it will be observed that the belt 43 carries the package into engagement with a stop plate 44 which extends across the belt.

The belt 43 is supported in the present apparatus by a pulley 45 carried by a shaft 46 which is journalled in suitable bearings carried by a main frame structure, all portions of which are referred to by the numeral 47. The conveyor belt may be driven from an electric motor or other suitable power source indicated at 48 (see Figure 2) which drives a chain 49 by means of a suitable sprocket 50 secured to the motor shaft. The chain 49 also engages sprockets 51, 52 and 53, respectively carried by shafts 54, 55 and 56 which are also suitably journalled in bearings carried by the frame structure 47.

The sprocket 52 may be merely an idler take-up sprocket suitably mounted for controlling the tautness of the chain 49, and its supporting shaft 55 may be merely a stub shaft carried by a movable arm or the like, the details of which are not illustrated inasmuch as they form no part of the invention herein claimed.

The conveyor chain 28 is employed not only for the conveying purposes already explained but also to transmit movement to the belt 43, this being accomplished through a further chain 57. The conveyor chain 28 is propelled continuously by engagement with a sprocket 58 carried by the driven shaft 54 (see Figures 4 and 10) and the chain is supported with its upper reach in proper position for conveying the packages by sprockets 59 and 60. The sprocket 60 is secured to the driven shaft 61 and the sprocket 59 is secured to a shaft 56 which is suitably journalled in bearings carried by the frame 47. The chain 57 transmits movement from the shaft 61 to the belt pulley shaft 46 through the agency of sprockets 62 and 63 which are secured respectively to the shafts 61 and 46.

The stop member 44 is suitably mounted on a top plate carried by the frame structure 47 and it is apertured as indicated at 64 for a purpose which will presently appear.

For delivering the filled packages from the conveyor 43 to the chain conveyor 28, there is provided a pusher 65 which is carried by a rod 66 slidably mounted in suitable bearings carried by the top plate of the frame structure. Feeding movement of the rod 66 may be effected by a spring 83 acting through one end of a bell crank 68 and timed by a rotary cam 67. The bell crank 68 has the free end 69 of one of its arms forked and slotted to embrace the rod 66 and a cross pin 70 carried by said rod. The other arm of the bell crank carries a roller 84 which is normally maintained in cooperative relationship to the periphery of the cam 67 which is carried by a rotatable shaft 72 suitably journalled in bearings carried by the frame structure 47. The bell crank 68 may be carried by a shaft 71 so as to be rockable in the manner indicated for effecting the desired reciprocation of the rod 66.

Figure 5:
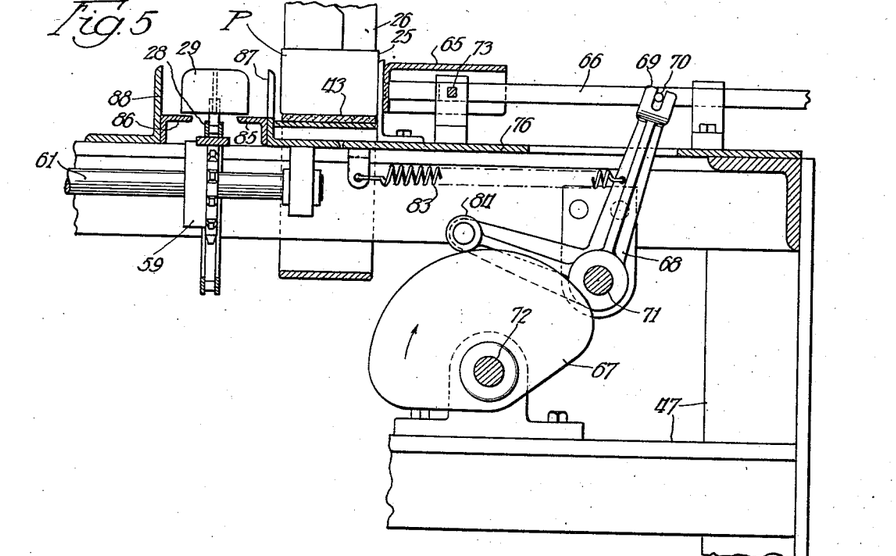
Figs. 5 and 6 are sections respectively on the lines 5—5 and 6—6 of Fig. 1.
Figure 6:
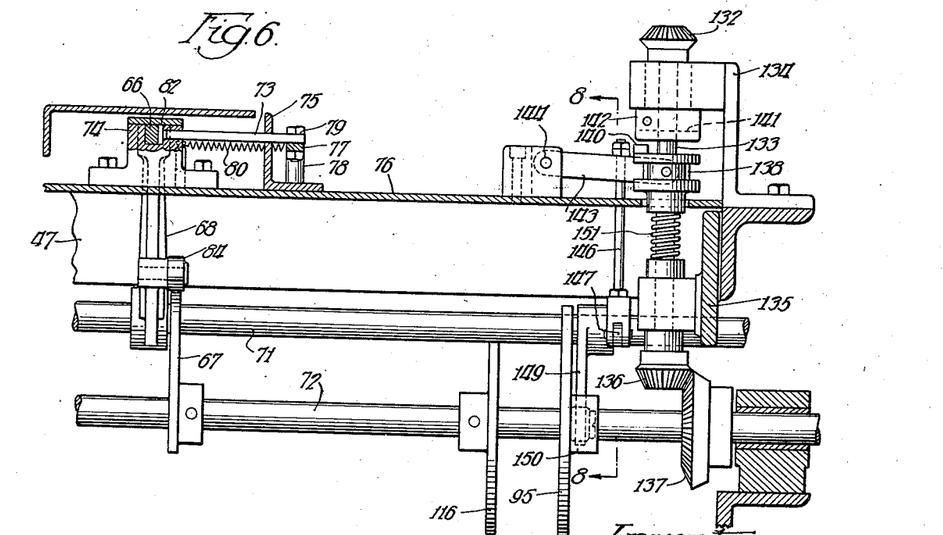

It is preferable that the transversely movable feeding head 65 be not moved across the conveyor 43 unless a filled package is delivered to proper position for being fed to the conveyor chain 28; such position is of course determined by the stop member 44. In order to prevent movement of the feeder head 65 except when a package is awaiting transmission to the conveyor chain 28, there is provided a locking rod 73 (see Figures 5 and 6) which is slidably mounted at one end in a supporting bearing 74 which also supports the rod 66 and adjacent its other end in a suitable bracket member 75 carried by the top plate 76 of the frame structure.

The locking rod 73 is controlled by an arm 77 pivoted at one end as indicated at 78 (see also Figure 1) on the top plate 76. Intermediate its ends the arm 77 is pivotally connected as shown at 79 to the adjacent end of the locking rod 73 and the free end of the arm 77 is bent so as to extend laterally into the opening 64 in the stop member 44. A spring 80 stretched between a portion of the arm 77 and a suitable point in the top plate 76 serves to normally urge said arm to move in such a direction as to cause its laterally extending end portion 81 to move through said opening 64. The spring 80 is a relatively light spring so that each package "P," upon engagement with the stop 44, is also able to move said arm 77 outwardly so as to withdraw the inner end of the locking rod 73 from a notch 82 provided in the rod 66.

If for any reason there should be a failure of package delivery to the stop 64, the locking rod 73 will be retained in locking engagement with the rod 66 so as to thereby prevent operative movement thereof. In such a case the cam 67 may continue its normal rotation but the cam roller will be held out of engagement with the cam until the cam has rotated sufficiently to restore such engagement.

When a package is delivered into position against the stop 44 as shown in Figure 1, the feeding head 65 will be actuated to move the package transversely onto inner and outer guides 85 and 86, respectively, which are disposed immediately above and on opposite sides of the conveyer chain 68. The operation of the feeding member 65 is so timed relative to the travel of the chain 28 that the packages will be delivered successively immediately in front of the flights or pushers 29 of the conveyor chain 28.

The packages will thereupon be advanced continuously on the guides 85 and 86, being held against sidewise displacement by upwardly extending inner and outer side guides 87 and 88.

Figure 3:
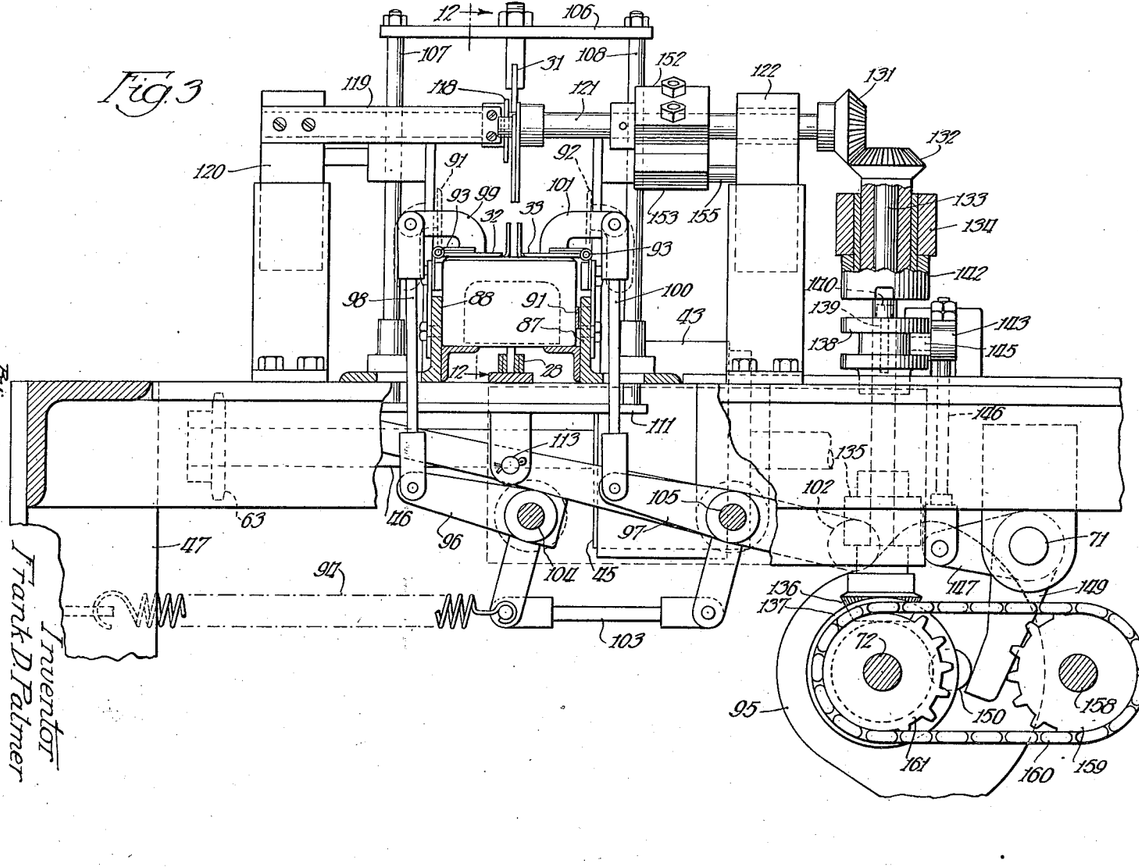

To effect the inward folding of the opposite side portions 89 and 90, respectively, of the package liner, there are provided hinged folding plates 32 and 33 the same being suitably hingedly connected as indicated at 93 as best shown in Figure 3 to the side guides 88 and 87. The hinged connection to the respective side guides 88 and 87 is preferably made vertically adjustable so as to facilitate adjustment of the vertical position of the folder plates 32 and 33 to the most suitable relationship to the particular packages being operated upon.

The folder plates 32 and 33 are normally in an upwardly extending position as shown in dotted lines in Figure 3 and they are rocked inwardly on their respective hinges 93 by means of a spring 94 under the control of a cam 95 carried by the shaft 72.

The spring 94 has one end anchored to the frame 47 of the apparatus and its other end connected directly to the free end of the depending arm of a bell crank 96 and through the agency of a link 103 to the free end of the depending arm of another bell crank 97. The bell cranks 96 and 97 are respectively rockably supported by stub shafts 104 and 105 which are supported by suitable brackets or otherwise attached to the framework of the apparatus. The bell crank 96 has a more or less horizontally extending arm connected at its free end by means of an upwardly extending link 98 to the free end of an arm 99 which is rigidly secured to the folding plate 32. The bell crank 97 is similarly connected by means of an upwardly extending link 100 to the free end of an arm 101 which is rigidly secured to the other folder 33.

The bell crank 97 is equipped with a third arm which extends laterally from its depending arm and carries a roller 102 which engages the periphery of the cam 95. The cam 95 is continuously rotated and is so timed that in proper relationship to the advancement of the package on the conveyor 28, the folding plates 32 and 33 will be rocked inwardly from the open position shown in dotted lines in Figure 3 to the closed position shown in full lines in said figure.

The folding plates 32 and 33 are preferably somewhat longer than the length of the package operated upon and said plates operate on the package during its travel with the conveyor 28. The transverse folding of the wrapper side portions is readily effected notwithstanding the relative longitudinal movement of the package and the folder plates since there is no high degree of pressure or friction created between the folding plates and the folded wrapper portions.

The end folding devices 31 and 30 cooperate with the side folding devices in that said end folders effect outward folding or distension of the end walls of the package liner 26.

The end folder 31 is in the form of a simple plate or shoe which is carried by a vertically reciprocable cross member 106 carried by rods 107 and 108 which are vertically slidably mounted in suitable brackets 109 and 110, respectively, which are fixedly mounted on or attached to the supporting structure of the apparatus. The lower ends of the rods 107 and 108 are also connected by a cross member 111 which has a centrally located, depending ear or lug 112. The ear 112 is pivoted as shown at 113 to a lever 114 which is in turn pivotally supported on the stub shaft 105. One end of the lever is provided with a roller 115 which cooperates with the periphery of a rotary cam 116 carried by the shaft 72. The other end of the lever 114 is carried by means of a spring 117 to a suitably located, stationary part of the apparatus, in this instance a part of the bracket 109.

It will be seen that incident to rotation of the cam 116, the lever 114 will be rocked so as to move the rods 107, 108 and the end folder 31 downwardly against the tension of the spring 117. The cam 116 is so timed that the end folder 31 will be moved downwardly within the area of the package, so that as an incident to the travel of the package its rearward end wall will come into engagement with the folder 31. Continued forward movement of the package will of course cause the relatively stationary folder 31 to bend or distend the rear end wall portion of the wrapper rearwardly. Such end folding action is effected during the time that the side wall folders 32 and 33 are folding the side wall portions of the wrapper inwardly. A suitable leaf spring 91 is mounted on the inner side wall guide 87 to hold the package snugly against the opposite side wall during the folding operations so as to insure uniform and sharp folding of all the packages.

Figure 13:
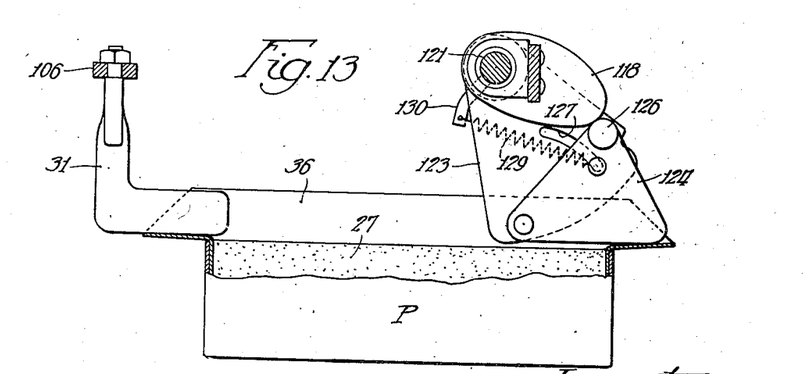
Fig. 13 is a section corresponding to Fig. 12 but showing the parts in an advanced position.

The front end folder 30 is an intermittently driven rotary device which is so operated as to fold the front end wall portion of the liner 26 forwardly at a speed which is greater than the speed of travel of the package on the conveyor 28. The details of construction of the front end folder 30 are best shown in Figures 12, 13 and 15 and they also appear to some extent in Figures 1 and 3.

The front end folder comprises a stationary cam 118, the same being held stationary by a bracket arm 119 which is secured at one end to a suitable stationary or frame part 120. The cam 118 is apertured to fit around a shaft 121 which is rotatably mounted at its opposite ends in the aforesaid part 120 and in a suitable bearing bracket 122.

The shaft 121 has secured to it for rotation therewith an approximately triangular plate member 123, the same being secured to the shaft by a set screw or the like so as to permit rotary adjustment of the position of the plate 123 on the shaft. An auxiliary triangular plate 124 is pivoted as indicated at 125 on the main plate 123 and it is provided at one corner with a stud or roller 126 which engages the periphery of the cam 118. The main plate 123 is slotted as shown at 127 to receive a pin 128 which is rigidly secured at one end to the auxiliary plate 124 and connected by a spring 129 to a pin or other suitable anchoring element 130 which may project from the hub 123a of the main plate 123.

The spring 129 serves to normally maintain the auxiliary plate 124 in retracted position with its roller or stud 126 in engagement with the periphery of the cam 118. During periods of rest of the shaft 121 the triangular plate structure comprising the plates 123 and 124 normally extends upwardly from the shaft 121 as indicated in dotted lines in Figure 12, so that said structure is out of the path of travel of the containers. The shaft 121 is intermittently rotated in such timed relation to the travel of the containers that the plate structure will be brought down inside of the package substantially as indicated in Figure 12, so that continued rotary movement of the plate structure will effect outward folding or distension of the front end wall portion of the package.

Incident to the rotation of the plates 123 and 124 around the cam 118, the latter effects outward rocking movement of the auxiliary plate 124 relative to the main plate 123 substantially as shown in Figure 13 to thereby cause the projected end or corner portion of the auxiliary plate 124 to fold said front end wall portion of the liner forwardly and to a substantially horizontal plane as indicated in Figure 13. The projection of the plate 124 relative to the plate 123 is of course effected by a cam 118 at such a speed that the part 124 advances relative to the package to effect the said forward end folding.

The shaft 121 is intermittently rotated by means of a driving connection with the shaft 72 and an automatically actuated clutch for intermittently effecting operative connection with said shaft 72. Said driving connection and clutch mechanism is best shown in Figures 1, 2, 3 and 6. As shown in said figures, the shaft 121 is provided with a bevelled gear 131 which meshes with a correspondingly bevelled gear 132 on the upper end of a shaft 133. The shaft 133 is rotatably supported adjacent its upper end by means of a bracket 134 and near its lower end by means of a bracket 135 (see Figure 6). The lower end of the shaft is provided with a bevelled gear 136 which meshes with a bevelled gear 137 carried by the cam shaft 72.

The gear 132 is not secured to the shaft 133 but is rotatable thereon and is adapted to be connected to the shaft for rotation therewith through the agency of a movable clutch collar 138 which is splined as indicated at 139 to the shaft 133. Said collar 138 is provided with a tooth 140 which is adapted to engage a notch 141 in a collar 142 which is suitably secured to the hub of the gear 132.

The collar 138 is controlled by an arm 143 pivoted at one end as shown at 144 in a suitable bracket provided for that purpose on the table plate 76 and the other or free end of the arm 143 is provided with a stud or roller 145 which enters the groove of the clutch collar 138. The arm 143 is connected by means of a connecting rod 146 to one end of an arm 147 of a bell crank lever which is carried by the shaft 71, the same being suitably secured or supported from the main frame work of the apparatus. The other arm 149 of said bell crank lever extends downwardly and is adapted to be periodically engaged by a roller or crank pin 150 carried by the cam disc 95.

A spring 151 disposed around the shaft 133 between the collar 138 and the upper end of the bearing portion of the bracket 135 serves to normally move the clutch member 138 upwardly into operative engagement with the clutch collar 141 for transmitting rotary movement from the shaft 133 to the upper gear 132 and the shaft 121.

The crank pin 150 serves, however, to normally hold said clutch collar 138 out of engagement with the clutch collar 142 so that the shaft 121 and its front end folding mechanism remain stationary for short intervals of time so related with the movement of the packages that when the folding plate structure is rotated downwardly it will always enter the package area immediately behind the leading or front end wall thereof.

In some instances the front end wall folding structure may be continuously rotated, this being especially true in respect of machines designed for the handling of relatively small packages. Where the packages are larger, especially longer, it is advantageous to employ the intermittently operated arrangement described in that it overcomes certain difficulties in respect of the synchronizing of the operation of the front end folder and the travel of the package.

Figures 7, 8, 9:
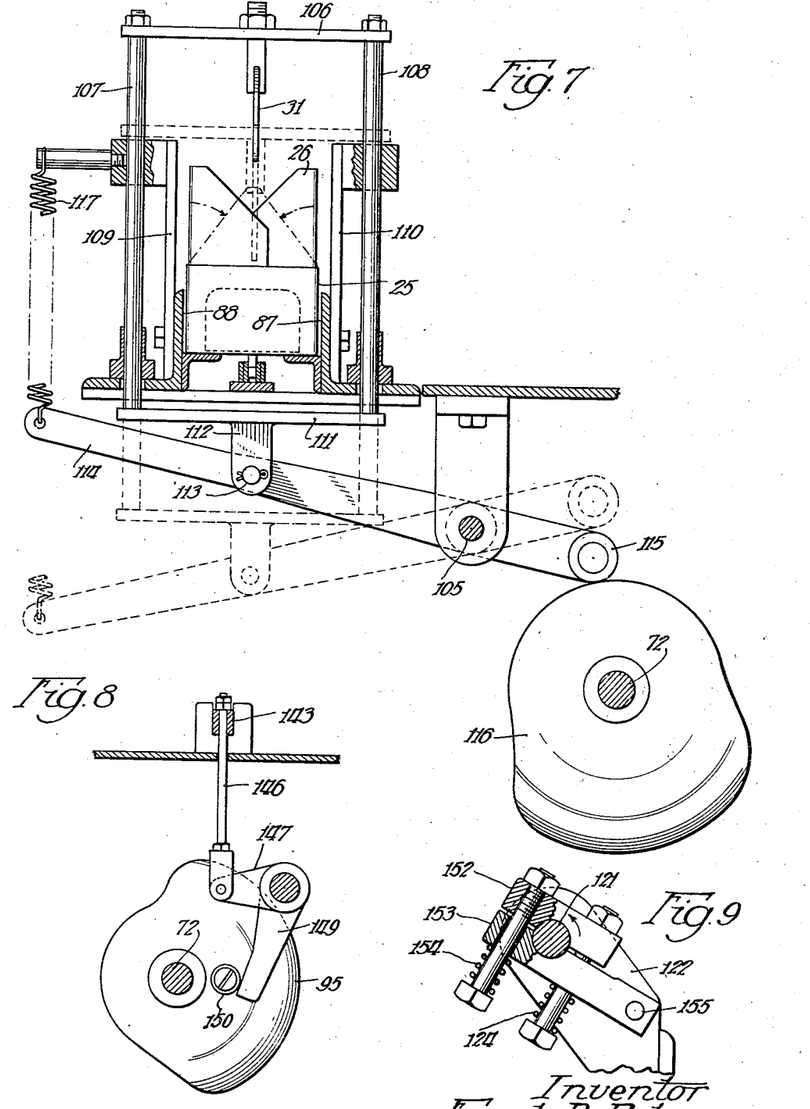
Fig. 7 is a section on the line 7—7 of Fig. 2.
Fig. 8 is a section on the line 8—8 of Fig. 6.
Fig. 9 is a section on the line 9—9 of Fig. 1.

In order to effectively hold the front end folder in its stationary, upwardly extending position, a friction device best shown in Figures 3 and 9 is employed. Said friction device comprises a pair of blocks 152 and 153, each provided with an arcuate recess partially embracing the shaft 121. Suitable spring means indicated at 154 is provided for yieldingly urging the friction blocks 153 and 152 to move toward each other to thereby frictionally grip the shaft 121. The gripping means is held against rotation by a pin 155 which interconnects the friction block 153 and the stationary bracket part 122. The frictional gripping effect of the blocks 152 and 153 on the shaft 121 is sufficient to hold the shaft against rotation when the clutch part 138 is disengaged from the clutch part 142 but it is not so strong that rotation of said shaft will be materially resisted when the said clutch parts are engaged.

Figure 4:
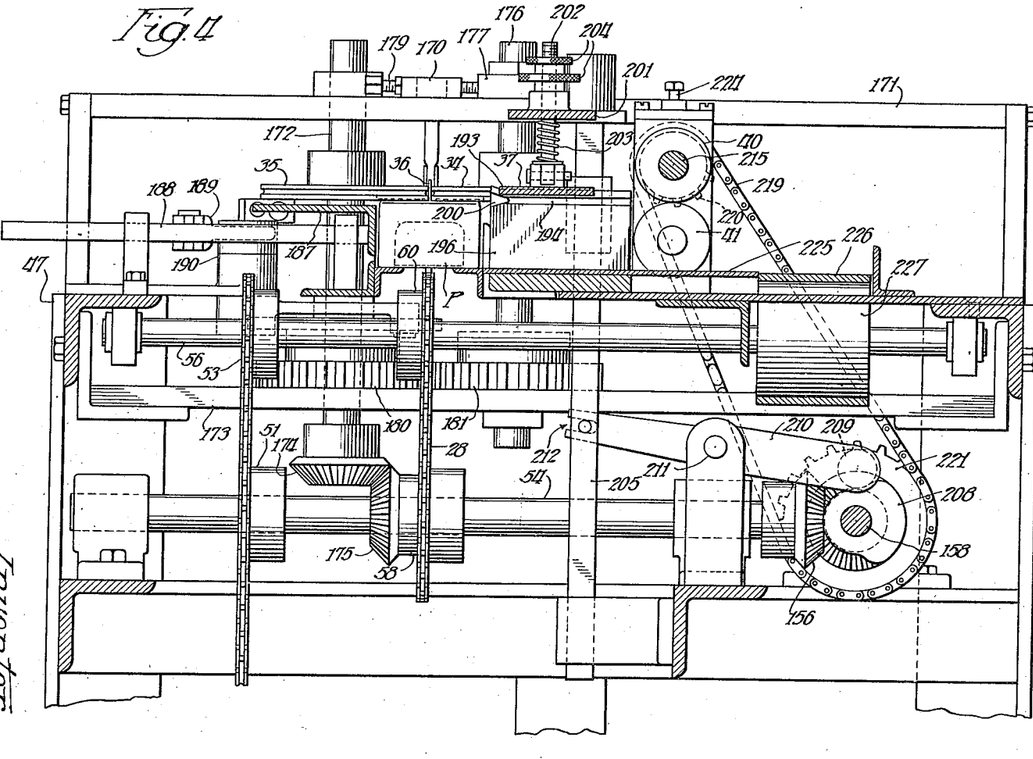
Fig. 4 is a section on the line 4—4 of Fig. 2.

The cam shaft 72 may conveniently be driven by a connection with the driven shaft 54. Said connection is best shown in Figures 1, 3 and 4. It comprises a bevelled gear 156 secured to the end of the shaft 54 and meshing with a bevelled gear 157 carried by a shaft 158 which is rotatably supported in suitable bearings carried by the supporting frame structure. Said shaft 158 is provided with a sprocket 159 which cooperates with a chain 160 which in turn engages a sprocket 161 carried by the shaft 72.

Figure 2:
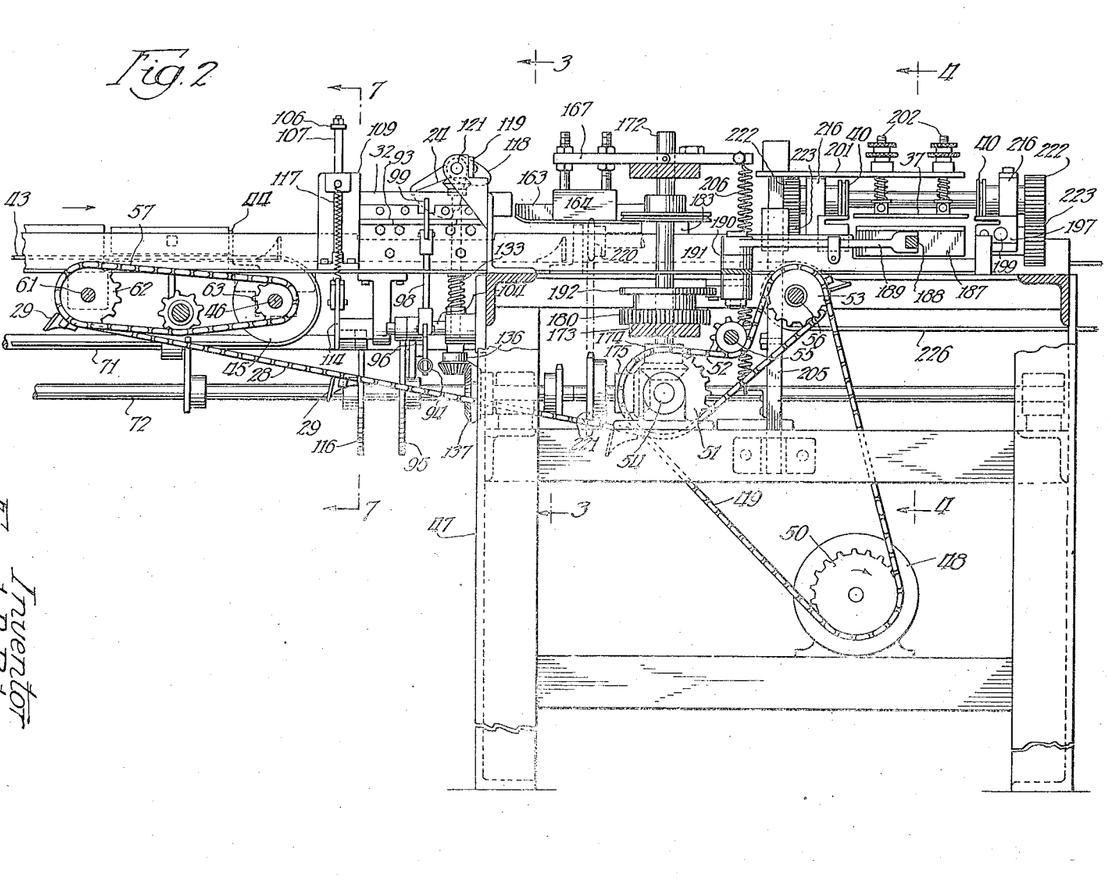
Figs. 2 and 3 are sections respectively on the lines 2—2 and 3—3 of Fig. 1 (the Fig. 3 section being also indicated by the line 3—3 of Fig. 2)

The package, with the upper portions of its liner or wrapper 26 folded to the condition illustrated in Figure 14, emerges from the folding plates 32 and 33 and moves under overlying pressers 162 and 163, the front end or receiving end portions of which are rounded upwardly as best shown in Figures 1 and 2 to facilitate entrance of the package thereunder. Said pressers 162 and 163 are suitably secured to a mounting block 164 which has its lower face grooved as shown at 165 to receive portions of said pressers and to receive the upwardly extending flange portion of the package. Said mounting block 164 is carried by the lower end of a bolt 166 which is in turn secured to a plate 167 which is hinged as indicated at 168 to a finger part 169 of a bracket 170, the latter being rigidly secured to a supporting cross bar 171. The cross bar 171 is supported as best shown in Figure 4 by suitable brackets extending upwardly from the frame structure 47.

The pressers 162 and 163 may be rocked upwardly to an inoperative position about the hinge connection 168 to thereby facilitate access to packages located thereunder in any event making such access desirable. The weight of the presser structure, particularly of the mounting block 164, serves to normally urge the pressers 162 and 163 downwardly into sliding contact with the inwardly folded side portions of the wrapper. The top of the package is thereby more or less ironed or smoothed and air, which may possibly have been entrapped between the package content and the inwardly folded wrapper portions, is expelled as an incident to such ironing action.

The sealing roll 35 is secured to a vertically disposed, rotatably mounted shaft 172 which is rotatably supported by the cross member 171 and by a lower cross member 173. At its lower end the shaft 172 is equipped with a bevelled gear 174 which meshes with another bevelled gear 175 carried by the driven shaft 54.

The sealing roll 34 is mounted on a vertical shaft 176 which is journalled at its lower end in the cross member 173 and at its upper end in an arm 177. The arm 177 is pivotally mounted intermediate its ends as shown at 178 (Figure 1). The shaft 176 passes through an elongated slot in the upper cross member 171 so that the shaft 176 may be moved at its upper end toward and from the shaft 172, whereby a desirable amount of adjustment may be made of the sealing roll 34 relative to the sealing roll 35. Separation of the rolls from each other may be limited by an adjustable set screw 179 carried by the bracket 170 and abutting the arm 177.

The sealing roll 34 is driven by means of a gear connection between the shafts 176 and 172, said connection comprising intermeshing gears 180 and 181 on the shafts 172 and 176, respectively.

The pressure wheels 34 and 35 are preferably driven at a peripheral speed which is slightly in excess of the speed of travel of the conveyor chain 28. Under such circumstances the pressure sealing wheels operate to effect forward movement of the packages at a slightly greater speed than the conveyor 28 but the latter catches up with each package as soon as the package is ejected from between the pressure wheels. The increased speed of rotation of the pressure wheels 34 and 35 is desirably in that it has the effect of avoiding a tendency of the united margins or flanges of the package to wrinkle or buckle when subjected to the pressure application, while being fed by the conveyor. As shown, the sealing rolls are so formed on their edges that they will form a pair of relatively narrow zones or bands of union.

The extent of adjustment required for the roll 34 relative to the roll 35 is quite slight in that its main purpose is to permit adjustment of the roll spacing to accommodate variations in the thickness of different runs of the wrapper material. Where thermoplastic coated wrapping material is employed, variations in the thickness of the thermoplastic coating offer no material problem since more or less of the coating may be displaced under the pressure of the wheels.

It is desirable, however, that the sealing wheels be adjustable so that they may be permitted to spread far enough at all times to prevent complete displacement of all of the thermoplastic coating material in the event that any particular lot of the sheeting which carries the thermoplastic coating happens to be substantially thicker than the normal thickness for such sheeting. The described adjustment is adequate for that purpose and it may be observed that the fit of the shaft 176 in its bearings may be initially made loose enough to permit the relatively slight disalignment of the shaft and its bearings incident to the single end adjustment described.

The thermoplastic coating of the wrappers 26 may, if the wrappers are themselves made of heat-sealable material, be softened to facilitate the uniting of the portions thereof by the pressure wheels 34 and 35. Heat may be applied either by providing electrical or other suitable heating elements in the mounting block 164 or along portions of the guides 162 and 163, or heat may be applied through the agency of the pressure wheels 34 and 35 by heating the latter.

The pressure wheels 34 and 35 may be heated, if desired, by means of electrical heating units such as indicated at 182 and 183 under outwardly disposed portions thereof as best shown in Figure 17. A suitable thermostatic control for the application of the heat may be associated with the heating elements if desired. In Figure 17 electrical heating coils are represented at 184 and a thermostatically controlled electrical switch at 185.

When the packages have passed between the pressure wheels 34 and 35, the conveyor chain 28 delivers them successively against an end stop 186, said end stop being beyond the zone of operation of the conveyor chain 28. The delivered package then rests on the respective guides 85 and 86 and it is subsequently fed transversely from said guides step by step into the zone of operation of the devices 37, 40 and 41 which were previously referred to.

The transverse feed of the packages is effected by means of a transversely reciprocating pusher 187 carried by a transversely reciprocable rod 188, the latter being slidably mounted adjacent its inner and outer ends by suitable bearing brackets carried by conveniently accessible parts of the frame structure (see Figures 1 and 4). The reciprocable feeding device comprises the parts 187 and 188 and is actuated by means of a bell crank 189 pivoted as indicated at 190 on a bracket carried by the frame structure. Said bell crank has the free end of one arm suitably connected to the reciprocable rod 188 and the free end of its other arm provided with a roller 191 for engagement with a cam 192. A spring 148 (see Figure 1) connected between a stationary part of the apparatus and a suitable part of the bell crank 189 serves to yieldingly advance the feeder 187—188 and to maintain the roller 191 in cooperative relationship to the cam 192.

The cam 192 is a rotary cam carried by the shaft 172 and it is so timed with relation to the feed of the packages that the pusher 187 will be operated at such periods as to successively transversely move the packages delivered against the end stop 186.

The first step of movement imparted to the filled and closed package moves the package under the plate 37. Incident to such movement of the package, the then upstanding joint flange 36 engages the front edge 193 of the plate 137 and is thereby folded rearwardly and downwardly into flatwise position on the top of the package.

The first step of movement of the filled package transversely also causes the then endwise extending triangular ears 38 and 39 to enter passageways 194 and 195 provided in heater blocks 196 and 197, respectively, which serve to soften the thermoplastic coating on the inside faces of the triangular ears 38 and 39 to facilitate transverse sealing of the same. As shown in Figure 19, the heating blocks 196 and 197 may be provided with electrical coils 198 for heating the respective blocks and the block 197 may be provided with a thermostatically controlled switch element 199 for regulating the heating effect of the coils 198. To facilitate entrance of the triangular ears of the package into the passageways 194 and 195, the receiving ends thereof may be flared as indicated at 200 (see Figure 4).

While the package remains at rest between the opposite heater blocks 194 and 195, the plate 37 is moved downwardly to press the top of the closed package to a desirable flattened condition. Said plate 37 is suspended from an arm 201 by means of a pair of screw-threaded rods 202, the same being suitably secured at their lower ends to the plate 37 and vertically slidably mounted in the arm 201. A spring 203 interposed between the bottom of the arm 201 and a suitable enlargement on each rod 202 serves to yieldingly hold the plate 37 in downwardly spaced relation to the arm 201, such relationship being determined by the setting of a pair of nuts 204 on the upper end of each of the screw threaded rods 202.

The arm 201 is secured to the upper end of a vertically slidably mounted rod 205, the same being suitably mounted for vertical sliding movement in bearing bosses or brackets carried by conveniently accessible parts of the frame structure (see Figures 2 and 4).

A spring 206 connected between a stationary frame part or arm 207 and a part of the rod 205 or a bracket secured thereto (see Figure 2) serves to normally hold the rod 205 and the presser plate 37 in elevated position. Downward movement of the presser plate 37 and rod 205 against the tension of the spring 206 is effected by means of a rotary cam 208 carried by the shaft 158. Said cam 208 acts against a roller 209 carried by one end of a lever 210 which is pivoted intermediate its ends as indicated at 211 on a suitable bracket provided for that purpose on the main frame structure, the other end of the lever being connected by means of a pin and slot connection such as indicated at 212 to the vertically slidable shaft or rod 205.

The cam 208 is so timed that during the period of rest of each package between the opposite heater blocks 196 and 197, the presser plate 37 will be lowered into engagement with the top of the package to flatten or otherwise shape the same. The presser plate is of course yieldingly applied by reason of the transmission of downward movement thereto through the spring 203, so that excessive pressure may not be applied to the package. The presser plate 37 serves to flatten downward the folded joint flange 36 and to more or less effect embedment thereof in the surface of the package and it will be apparent that the said presser plate may be shaped as desired to control the shape of the top of the package.

The next step of transverse movement of the package causes its end ears 38 and 39 to pass between pairs of sealing rollers, each pair embodying an upper roller 40 and a lower roller 41. The upper rollers 40 are carried by a shaft 215 which is journalled in vertically adjustable bearings supported in journal housings or brackets 216 and the lower rollers 41 are respectively carried by short shafts 217 and 218 (see Figure 20), there being no shaft extending between the rollers 41 since the package itself must pass therebetween. The upper rollers 40 are driven at the desired speed by means of a chain 219 which engages a sprocket 220 on the shaft 215 (see Figures 1 and 4) and a sprocket 221 on the driven shaft 158.

The rolls 41 are each driven by means of gear connections with the shaft 215 as best shown in Figure 2, said shaft 215 being provided with gears 222 meshing with gears 223 carried by the shafts 217 and 218.

The upper rolls 40 are adjusted by suitable means such as adjusting screws indicated at 224 into the desired relationship with the lower rolls 41, so that the triangular ears of the package which pass between the respective pairs of rolls will be squeezed together to the desired extent to effect sealing of the ears transversely thereacross closely adjacent the ends of the package. The rolls 40 and 41 grip the ears of the package with sufficient force to effectively feed the ears and therewith the package through the zone of operation of the rolls 40 and 41, until the package is released therefrom and is deposited on an end portion of the table or guide plate 225.

The succeeding package will serve to advance the preceding package whereby the completely sealed package with its ears remaining in endwise extending position will be deposited on a conveyor belt 226 which may be arranged to carry the package to other apparatus for further operations on the package. The belt 226 is supported in the disclosed apparatus by a pulley 227 which is carried by the driven shaft 56. Hence the conveyor 226 is operative to carry packages from the apparatus at the same rate of speed that the packages are carried through the apparatus by the conveyor 28 which is supported by sprockets carried by said shaft 56.

In the apparatus as described, the package is conveyed continuously during which time certain operations are performed by movements extending transversely of the direction of travel of the package. The apparatus is thereby capable of performing its operations on the package at a considerably higher rate of speed than is normally practicable where packages are advanced step by step and held stationary during the performance of some of the operations. The intermittent transverse feed of the packages for the performance of certain finishing operations does not require any slowing up of the operations during the continuous feed of the packages; during the transverse feed of the packages a relatively short travel is required in respect of each operation.

The apparatus described embodies relatively simple mechanical devices which are not apt to get out of order and which require no very sensitive adjustments. Hence the described apparatus is highly efficient and practicable.

Changes in the described structure may be made without departing from the spirit of the invention, the scope of which should be determined by reference to the following claims, the same being construed as broadly as possible, consistent with the state of the art.

I claim:

1. In apparatus of the class described, the combination of means for feeding a partially wrapped package in a predetermined direction, means for folding oppositely disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for uniting said marginal areas in said face to face relation, and means for uniting the folds of said outwardly folded portions independently of the union of said marginal areas.

2. In apparatus of the class described, the combination of means for continuously feeding a partially wrapped package in a predetermined direction, means for folding oppositely disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for uniting said marginal areas in said face to face relation, said folding and sealing means being operative while the package continues its feed movement, and means for uniting the folds of said outwardly folded portions independently of the union of said marginal portions.

3. In apparatus of the class described, the combination of means for continuously feeding a partially wrapped package in a predetermined direction, means for folding oppositely disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for sealing together said marginal areas in said face to face relation, said folding and sealing means being operative while the package continues its feed movement, means for receiving the package from said sealing means, means for feeding the received packages step by step on said receiving means, and means operative on the package while on said receiving means for sealing together the folds of said outwardly folded wrapper portions.

4. In apparatus of the class described, the combination of means for continuously feeding a partially wrapped package in a predetermined direction, means for folding oppositely disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for sealing together said marginal areas in said face to face relation, said folding and sealing means being operative while the package continues its feed movement, means for receiving the package from said sealing means, means for feeding the received packages step by step on said receiving means, and means operative during a step of movement of the package on said receiving means for sealing together the folds of said outwardly folded wrapped portions.

5. In apparatus of the class described, the combination of means for continuously feeding a partially wrapped package in a predetermined direction, means for folding oppositely disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for uniting said marginal areas in said face to face relation, said folding and sealing means being operative while the package continues its feed movement, means for receiving the package from said sealing means, means for feeding the received packages transversely step by step on said receiving means, and pairs of sealing rolls for acting on said outwardly folded wrapper portions during a transverse step of movement of the package for sealing together the folds of said outwardly folded portions.

6. In apparatus of the class described, the combination of means for continuously feeding a partially wrapped package in a predetermined direction, means for folding opposite disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for uniting said marginal areas in said face to face relation, said folding end sealing means being operative while the package continues its feed movement, means for receiving the package from said sealing means, means for feeding the packages transversely on said receiving means, means for folding said united marginal areas into flatwise position on said wall of the package as an incident to the transverse movement of the package, and means for sealing together the folds of said outwardly folded wrapper portions.

7. In apparatus of the class described, the combination of means for continuously feeding a partially wrapped package in a predetermined direction, means for folding oppositely disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for uniting said marginal areas in said face to face relation, said folding end sealing means being operative while the package continues its feed movement, means for receiving the package from said sealing means, means for feeding the packages transversely on said receiving means, means for folding said united marginal areas into flatwise position on said wall of the package as an incident to the transverse movement of the package, means for applying shaping pressure to said wall of the package, and means for sealing together the folds of said outwardly folded wrapper portions.

8. In apparatus of the class described, the combination of means for continuously feeding a partially wrapped package in a predetermined direction, means for folding oppositely disposed portions of the wrapper inwardly over one wall of the package and marginal areas of such oppositely disposed portions into face to face relation, means for folding other oppositely disposed portions of the wrapper outwardly from said wall of the package, said outwardly folded portions being also folded upon themselves as an incident to the inward folding of said first mentioned wrapper portions, means for uniting said marginal areas in said face to face relation, said folding end sealing means being operative while the package continues its feed movement, means for receiving the package from said sealing means, means for feeding the packages transversely on said receiving means, means for folding said united marginal areas into flatwise position on said wall of the package as an incident to the transverse movement of the package, said last mentioned folding means comprising a presser plate movable toward and from said wall of the package, means for effecting movement of said presser plate into engagement with said wall to shape the same, and means for sealing together the folds of said outwardly folded wrapper portions.

9. In apparatus of the class described, means for continuously feeding laterally packages having wrapper portions extending above the normal top of the package from the sides thereof, means operative as an incident to the travel of the package for engaging the interior of the rear wall upwardly extending wrapper portion to fold the same outwardly relative to said top of the package as an incident to the movement thereof, means movable faster than the feed of the package for engaging the interior of the forward, upwardly extending wrapper wall portion to fold the same outwardly from the front wall of the package, means operative during the feed movement of the package for engaging the exterior of the oppositely disposed, upwardly extending side wall wrapper portions for folding the same inwardly to close the top of the package, said inwardly and outwardly folding means being so synchronized in operation that the outwardly folded front and rear wall wrapper portions will be folded upon themselves as an incident to the inward folding of said side wall wrapper portions, means for sealing together said inwardly folded wrapper portions, means for receiving packages from said feeding means and effecting continued movement thereof in a transverse direction, and means for sealing together the folds of said outwardly folded wrapper portions during the course of movement thereof in said transverse direction.

10. In apparatus of the class described, means for continuously feeding laterally packages having wrapper portions extending above the normal top of the package from the sides thereof, means operative as an incident to the travel of the package for engaging the interior of the upwardly extending rear wall wrapper portion to fold the same outwardly relative to said top of the package as an incident to the movement thereof, fixed rotary means for engaging the interior of the forward, upwardly extending wrapper wall portion to fold the same outwardly from the front wall of the package, and means operative during the feed movement of the package for engaging the exterior of the oppositely disposed, upwardly extending side wall wrapper portions for folding the same inwardly to close the top of the package.

11. In apparatus of the class described, the combination of means for continuously laterally advancing a package having a wrapper portion extending upwardly from its side walls and adapted to be folded to close the top of the package, means movable vertically for engaging the interior of the upwardly extending rear wall wrapper portion to effect outward folding thereof as an incident to the travel of the package, means for effecting vertical reciprocation of said rear wall engaging means in such timed relation to the travel of the package as to cause the same to be lowered into operative position after the upwardly extending front wall wrapper portion has passed by, rotary means for engaging the interior of the front upstanding wall portion to effect outward folding thereof during the travel of the package, said rotary means comprising a cam member, a mounting plate and a folder plate pivoted on said mounting plate and provided with means for engaging said cam, said cam being operative to actuate said folding plate so as to cause the same to move forwardly in engagement with the interior of said front wall wrapper portion to thereby effect said outward folding thereof as an incident to rotation of said mounting plate.

12. In apparatus of the class described, means for propelling laterally a package having wrapper portions extending upwardly from the side walls of the package, means for folding outwardly the wrapper portion extending upwardly from the leading side wall during the travel of the package, said means comprising a normally stationary cam, a mounting plate, means for rotating said mounting plate, and a folding plate pivoted on said mounting plate and having means for engaging said cam so as to be actuated thereby as an incident to its rotation with said mounting plate about said cam.

13. In apparatus of the class described, means for propelling laterally a package having wrapper portions extending upwardly from the side walls of the package, means for folding outwardly the wrapper portion extending upwardly from the leading side wall during the travel of the package, said means comprising a normally stationary cam, a mounting plate, means for rotating said mounting plate, a folding plate pivoted on said mounting plate and having means for engaging said cam so as to be actuated thereby as an incident to its rotation with said mounting plate about said cam, and means for intermittently stopping the rotation of said mounting and folding plates in such upwardly disposed position as will permit the upstanding leading wall portion of the wrapper to pass under said mounting and folding plates, thereby to enable said mounting and folding plates to move outwardly from the interior of the package.

14. In apparatus of the class described, means for propelling a package having heat sealable wrapper portions extending upwardly from the side walls of the package, means for folding one pair of opposed upwardly extending side wall portions inwardly over the top of the package and marginal areas of said opposed portions into face to face relation in upwardly extending relation to the top of the package, means for folding another pair of opposed wrapper portions outwardly, said outwardly folded portions being also folded upon themselves as an incident to the inward folding of said first mentioned portions, means for applying heat and pressure to said upwardly extending, face to face marginal areas so as to unite the same, and means for applying heat and pressure to said outwardly folded end portions in zones extending transversely of said marginal areas so as to unite the folds of said end portions.

15. In apparatus of the class described, the combination of a pair of rotatable sealing rolls adapted to receive between them wrapper portions adapted to be thereby joined, shafts carrying the respective sealing wheels and each journalled at a distance from its sealing wheel in a normally fixed bearing, one of said shafts being also journalled adjacent its sealing wheel in a normally fixed bearing, and a laterally adjustably mounted bearing adjacent the other sealing wheel, said adjustable bearing permitting limited adjustment of the sealing wheels toward and from each other to thereby control the sealing effect thereof.

16. In apparatus of the class described, the combination of a conveyor for continuously propelling packages, a pair of sealing rolls for acting on wrapper portions of the packages to unite the same, means for driving said sealing rolls at a higher rate of speed than said conveyor so as to thereby cause the sealing rolls to feed the package forwardly independently of the movement of the conveyor, whereby wrinkling and buckling of the sealed portions of the wrapper are avoided.

17. In apparatus of the class described, the combination of means for feeding laterally a package comprising a wrapper extending upwardly from the sides of the package, means for engaging the interior of the upwardly projecting front and rear portions of said wrapper to fold the same outwardly, said means comprising a relatively fixed, rotary member for engaging and folding said front portion, and means for engaging the exterior of the upwardly projecting side portions of the wrapper to fold the same inwardly so as to close the top of the package.

18. In apparatus of the class described, means for continuously feeding laterally packages having wrapper portions extending above the normal top of the package from the sides thereof, means normally disposed above the top edge of the front wall wrapper portion and movable downwardly into the path of travel of the rear wall wrapper portion for engaging the interior thereof and effecting folding of the same rearwardly and outwardly of the package as an incident to the movement thereof, means movable faster than the feed of the package for engaging the interior of the forward, upwardly extending wrapper wall portion to fold the same outwardly from the front wall of the package, and means operative during the feed movement of the package for engaging the exterior of the oppositely disposed, upwardly extending side wall wrapper portions for folding the same inwardly to close the top of the package.

19. In apparatus of the class described, the combination of means for feeding laterally a package having a wrapper extending upwardly from the sides of the package, means for engaging the interior of the upwardly projecting front and rear portions of said wrapper to fold the same outwardly, said means comprising a relatively fixed, rotary member for engaging and folding said front portion outwardly, and means normally disposed above the top edge of the front wall wrapper portion and movable downwardly into the path of travel of the upwardly extending rear wall wrapper portion, said last mentioned means being adapted to engage the interior of said upwardly extending rear wall portion to effect outward folding thereof as an incident to the travel of the package.

20. In apparatus of the class described the combination of means for propelling laterally a package having a wrapper extending upwardly from the sides thereof and adapted to be folded to close the top of the package, means for engaging the interior upwardly extending front and rear wall wrapper portions to fold the same outwardly, means for engaging the exterior of the upwardly extending side wall wrapper portions to fold the same inwardly over the package, a pair of pressure sealing wheels for receiving between them portions of the inwardly folded wrapper side portions for uniting the same, and presser means overlying said conveyor intermediate said folding and sealing means and normally urged downwardly into pressing contact with the inwardly folded wrapper portions during the movement of the package from said folding means to said sealing means, said presser means serving, as an incident to the travel of the package thereunder, to expel air which may be entrapped between said inwardly folded wrapper portions and the top surface of the package content.

21. In apparatus of the class described, a conveyor for laterally propelling a package having wrapper portions extending upwardly from the sides of the package, and means for folding said upwardly extending wrapper portions to close the top of the package, said means comprising folding plates extending in the direction of travel of the packages and mounted for pivotal movement about axes extending in said direction so as to be rockable from an initial position outwardly of the upstanding wrapper side portions to substantially parallel, face-to-face relationship to the top of the packages, thereby to fold said upstanding wrapper side portions inwardly over the top of the package content and in contact therewith, and means for so rocking said folding plates.

FRANK D. PALMER.